(12) United States Patent
Herrmann et al.

(10) Patent No.: US 11,239,523 B2
(45) Date of Patent: Feb. 1, 2022

(54) BATTERY PACK COUPLING SYSTEM

(71) Applicant: Andreas Stihl AG & Co. KG, Waiblingen (DE)

(72) Inventors: Markus Herrmann, Fellbach (DE); Alexander Nordmann, Stuttgart (DE); Markus Redl, Niederndorf (AT); Joachim Kolb, Ludwigsburg (DE); Georg Duregger, Niederndorf (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 316 days.

(21) Appl. No.: 16/571,636

(22) Filed: Sep. 16, 2019

(65) Prior Publication Data
US 2020/0091475 A1 Mar. 19, 2020

(30) Foreign Application Priority Data

Sep. 17, 2018 (EP) .................................... 18194885

(51) Int. Cl.
*H01M 50/20* (2021.01)
(52) U.S. Cl.
CPC ........ *H01M 50/20* (2021.01); *H01M 2220/30* (2013.01)
(58) Field of Classification Search
None
See application file for complete search history.

(56) References Cited

FOREIGN PATENT DOCUMENTS

| EP | 2 819 207 A1 | 12/2014 |
| EP | 3 309 862 A1 | 4/2018 |
| WO | WO 2013/139371 A1 | 9/2013 |
| WO | WO 2018/007111 A1 | 1/2018 |

OTHER PUBLICATIONS

European Search Report issued in counterpart European Application No. 18194885.2 dated Jul. 15, 2019 with partial English translation (15 pages).
English translation of document B1 (EP 2 819 207 A1 previously filed on Sep. 16, 2019) 14 pages.

*Primary Examiner* — Wyatt P McConnell
(74) *Attorney, Agent, or Firm* — Crowell & Moring LLP

(57) ABSTRACT

A battery pack coupling system for mechanically and/or electrically coupling a battery pack optionally to a harness device or to a manually operated electrical device includes a mechanical backpack coupling interface at the battery pack for the releasable mechanical coupling to a corresponding mechanical battery pack-backpack coupling interface at the harness device and/or an electrical coupling interface at the battery pack and an electrical connecting line with a connecting plug body at the end which can be releasably coupled to the electrical coupling interface. The battery pack coupling system has a mechanical device coupling interface at the battery pack, different from the mechanical backpack coupling interface, for the releasable mechanical coupling to a corresponding mechanical battery pack-device coupling interface at the electrical device and/or a plug fastening mechanism through which the connecting plug body can be fastened releasably to the harness device.

19 Claims, 3 Drawing Sheets

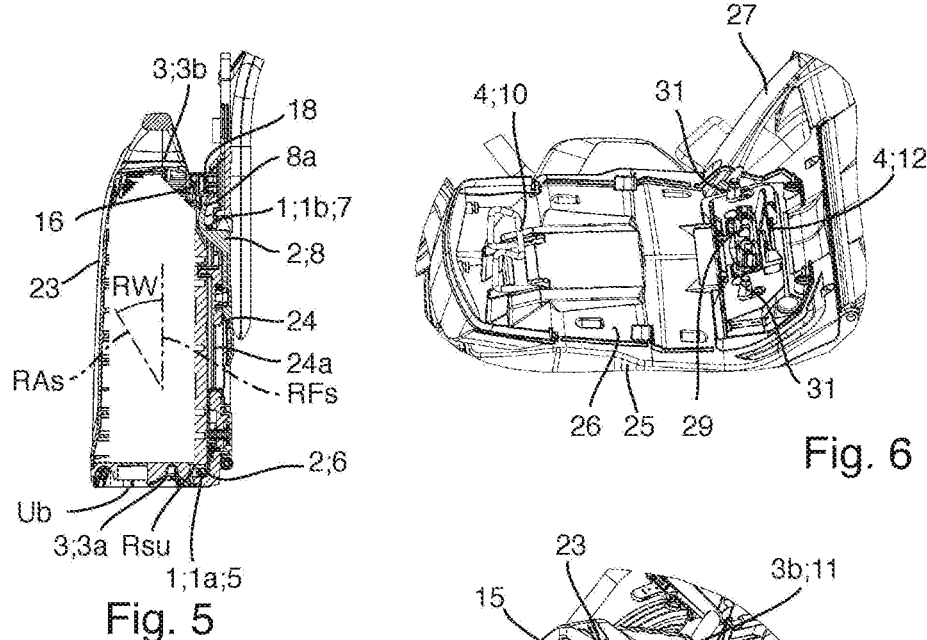
Fig. 5
Fig. 6
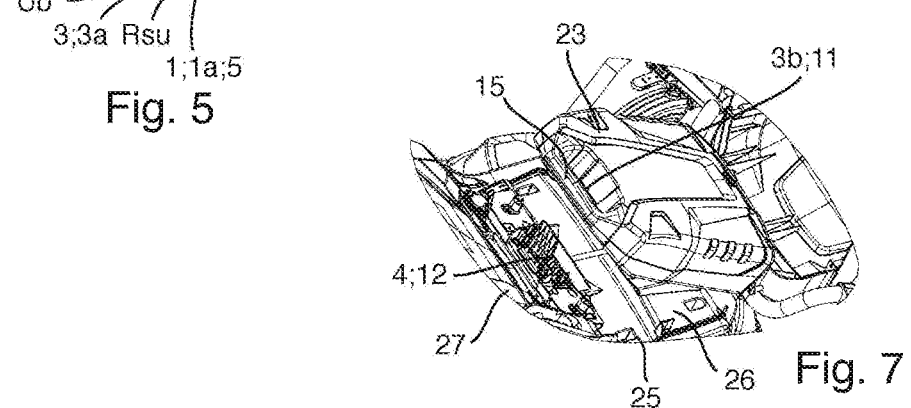
Fig. 7
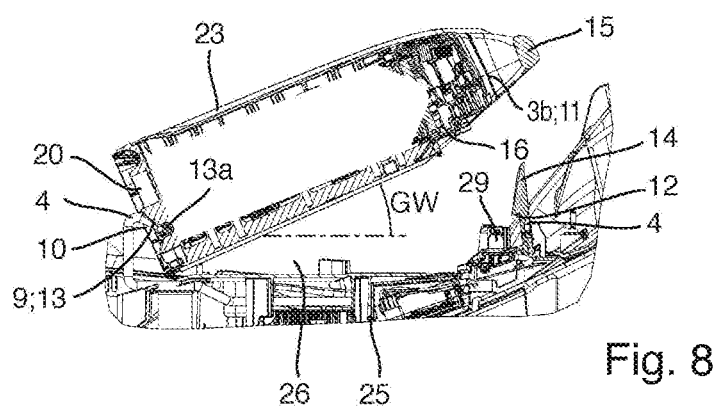
Fig. 8

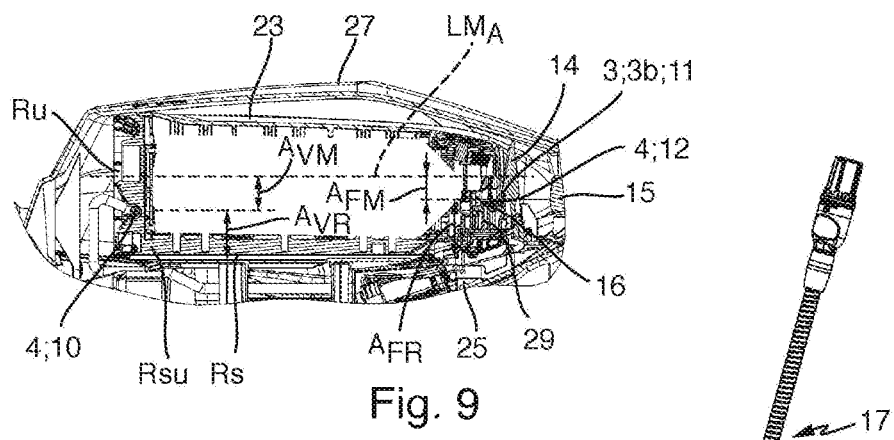
Fig. 9
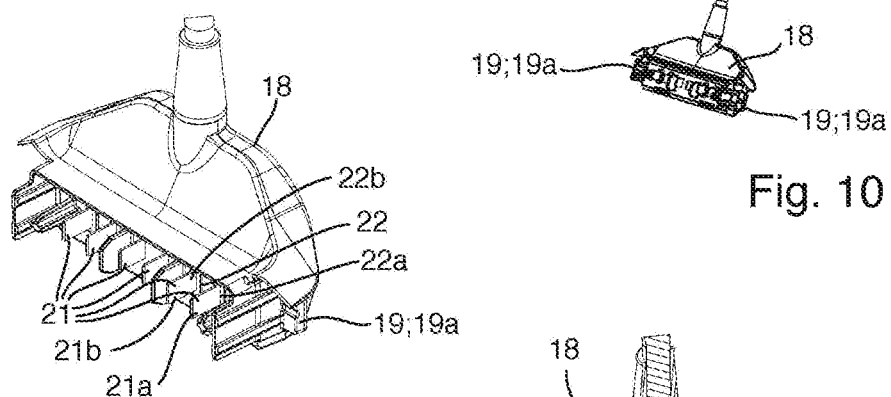
Fig. 10
Fig. 11
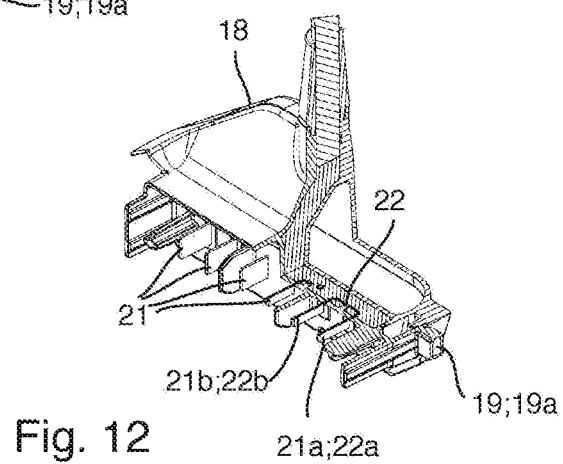
Fig. 12

BATTERY PACK COUPLING SYSTEM

BACKGROUND AND SUMMARY OF THE INVENTION

The invention relates to a battery pack coupling system for mechanically and/or electrically coupling a battery pack selectively to a harness device or to a manually operated electrical device, wherein the battery pack coupling system comprises a mechanical backpack coupling interface at the battery pack for the releasable mechanical coupling to a corresponding mechanical battery pack-backpack coupling interface at the harness device and/or an electrical coupling interface at the battery pack and an electrical connecting line with a connecting plug body at the end which can be releasably coupled to the electrical coupling interface.

The battery pack can in particular be one such as is used for the supply of electrical energy to manually operated electrical devices, in particular electrically driven garden and/or woodland cultivation devices. Manually operated electrical devices refer here primarily to electrical devices that are carried in the hand or along the ground, in particular such as are used for garden and/or woodland cultivation, such as powered saws, hedge cutters, leaf blowers, sweeping devices, lawnmowers and scarifiers, to mention only a few exemplary embodiments by way of example. The battery pack is suitable, by means of the battery pack coupling system, for being coupled mechanically and/or electrically optionally to the harness device or to the electrical device.

In the present case, except where otherwise stated, the positional orientation of the said components refers to the orientation of the harness device when it is located on the back of a user, or to the orientation of the battery pack in the holding position or the carrying position as is, for example, the case when the user carries the harness device with the battery pack on his back.

Laid-open publication EP 2 819 207 A1 discloses a battery pack coupling system of the type mentioned above. The system described there comprises a single mechanical interface at the battery pack in the form of latching projections arranged in the lower side region with which it is mechanically coupled through a respective latching/snap-on connection optionally to the harness device or the electrical device and can be held in an appropriate holding position, for which purpose respective corresponding mating latching projections are provided. The battery pack can be docked to a topside edge of a carrier base of the harness device functioning as a pivot axis while retaining a certain pivoting movability, whereby it can be pivoted from the docking position into the holding position at the carrier base. A handle is arranged at the underside of the battery pack, that is at the side that is at the bottom in the holding position, i.e. in a carrying position on the back of a user. The battery pack has a first electrical coupling interface for the supply of energy of the electrical device and a second electrical coupling interface, different therefrom, for electrically charging the battery pack. The harness device and the electrical device each have an electrical connection interface in a fixed position that can be coupled to the first electrical coupling interface of the battery pack, wherein the electrical contact is made automatically through bringing the battery pack into its respective holding position at the harness device or at the electrical device. A flexible connecting line for connecting an electrical device that is to be driven leads from the fixed-position electrical connection interface of the harness device.

It is an object of the invention to provide a battery pack coupling system of the type mentioned at the outset which offers advantages over the prior art mentioned above in terms of the mechanical and/or electrical coupling of the battery pack on the one hand and the harness device or electrical device on the other hand.

The invention achieves this and other objects by providing a battery pack coupling system having specific inventive features. Advantageous developments of the invention are mentioned in the dependent claims, the content of which is hereby incorporated into the description through reference.

According to one aspect of the invention, the battery pack coupling system comprises two different mechanical coupling interfaces at the battery pack, a backpack coupling interface for the releasable mechanical coupling of the battery pack to the harness device or, put more precisely, to a corresponding mechanical battery pack-backpack coupling interface at the harness device, and a device coupling interface for the releasable mechanical coupling of the battery pack to the electrical device or, put more precisely, to a corresponding mechanical battery pack-device coupling interface at the electrical device. This measure has the advantage that the two interfaces can each be designed specifically for the requirements of the mechanical coupling of the battery pack to the harness device or to the electrical device, without having to make compromises in this respect as would be the case with the use of just a single mechanical coupling interface at the battery pack for both possible couplings. These said requirements may very well differ greatly; for example, the coupling of the battery pack to the electrical device is often subject to relatively heavy vibrations such as typically occur inter alia with ground-travelling electrical devices such as a lawnmower. Vibrations of this sort normally do not occur in the case of the harness device carried on the back of a user. The coupling of the battery pack to the harness device therefore in the majority of application cases only needs to be designed for a mechanical stability that is lower in comparison with the coupling of the battery pack to the electrical device, with corresponding savings in manufacturing effort. The coupling of the battery pack to the electrical device can be designed, according to requirements, for a mechanical stability that is sufficiently higher.

In a development of the invention, the mechanical backpack coupling interface of the battery pack comprises a backpack docking element at the battery pack with which the battery pack can be docked in a pivoting manner at the harness device, and a backpack holding element at the battery pack for holding the battery pack at the harness device. The backpack docking element is arranged here at a lower rear region of the battery pack, and the backpack holding element is arranged at an upper rear region of the battery pack. This yields an advantageous handling and stability characteristic for the coupling of the battery pack to the harness device. The battery pack can for this purpose first be docked to the harness device with its lower rear region and then pivoted into its holding position, which is most often a standing, approximately vertical position of the battery pack, wherein the associated pivot axis accordingly advantageously lies in the lower rear region of the battery pack or in any event in the vicinity of its lower rear region. The user can as a result therefore usually perform the coupling of the battery pack to the harness device without difficulty with one hand, i.e. without having to make use of a second hand. The same applies to the removal of the battery pack. It is helpful here if a handle of the battery pack is provided at its topside region.

In one embodiment of the invention, the backpack docking element of the battery pack is arranged in particular at a lower rear corner region of the battery pack. This measure is advantageous for typical applications for achieving a favourable docking behaviour and a favourable position of the pivot axis for pivoting the battery pack from its docking position at the harness device into its holding position at the harness device.

In one embodiment of the invention, the backpack docking element of the battery pack comprises a backpack wire bracket element or a backpack bracket accepting element at the battery pack, and the battery pack coupling system contains the corresponding mechanical battery pack-backpack coupling interface at the harness device. The mechanical battery pack-backpack coupling interface of the harness device here comprises a backpack bracket accepting element that works together in a pivoting manner with the backpack wire bracket element of the battery pack, or a backpack wire bracket element that works together in a pivoting manner with the backpack bracket accepting element of the battery pack. This represents a realization of the means for docking the battery pack to the harness device that is advantageous from the points of view of stability, the ability to pivot, and low manufacturing effort.

In one embodiment of the invention, the backpack holding element of the battery pack contains a backpack latching element at the battery pack, and the battery pack coupling system comprises the corresponding battery pack-backpack coupling interface at the harness device, wherein the mechanical battery pack-backpack coupling interface of the harness device contains a backpack mating latching element that works together in a releasable latching manner with the backpack latching element of the battery pack. This realizes a releasable latching connection for holding the battery pack at the harness device in an advantageous manner.

In a development of the invention, the mechanical device coupling interface of the battery pack comprises a device docking element at the battery pack for the pivotable docking of the battery pack to the electrical device, and a device holding element at the battery pack for holding the battery pack at the electrical device. The device docking element is arranged here at an underside region of the battery pack, and the device holding element is arranged at a topside region of the battery pack. This yields an advantageous handling and stability characteristic for the coupling of the battery pack to the electrical device. The battery pack can for this purpose first be docked at the bottom to the electrical device, whereby a degree of weight relief can already result for the user, and then pivoted into the holding position at the electrical device, which is often an approximately horizontal orientation of the battery pack. Since the associated pivot axis is accordingly located in the underside region of the battery pack, or at any rate in its vicinity, the user can usually perform the pivoting from the docking position at the electrical device into the holding position with one hand, i.e. without having to make use of a second hand. The same applies to pivoting out of the holding position at the electrical device into the docking position. It is helpful here if a handle of the battery pack is provided at its topside region.

In one embodiment of the invention, the device docking element of the battery pack contains a device bracket accepting element or a device wire bracket element at the battery pack, and the battery pack coupling system comprises the corresponding mechanical battery pack-device coupling interface at the electrical device, wherein the mechanical battery pack-device coupling interface comprises a device wire bracket element that works together in a pivoting manner with the device bracket accepting element of the battery pack, or a device bracket accepting element that works together in a pivoting manner with the device wire bracket element of the battery pack. This represents a realization of the means for docking the battery pack to the electrical device that is advantageous from the points of view of handling, the ability to pivot, and low manufacturing effort.

In a further embodiment of the invention, the device bracket accepting element contains an accepting profile body with a bracket accepting region having U-shaped cross-section. This represents a realization for the device wire bracket accepting element at the battery pack or at the electrical device that is advantageous from the points of view of low manufacturing effort and secure, pivoting acceptance of the corresponding device wire bracket element.

In one embodiment of the invention, the device holding element of the battery pack contains a device latching element at the battery pack, and the battery pack coupling system comprises the corresponding mechanical battery pack-device coupling interface at the electrical device, wherein the mechanical battery pack-device coupling interface of the electrical device comprises a device mating latching element that works together in a releasable latching manner with the device latching element of the battery pack. This realizes a releasable latching connection for holding the battery pack at the electrical device in an advantageous manner.

In a further embodiment of the invention, the battery pack coupling system comprises a user-actuated unlatching operating element for releasing the latching connection of the device latching element of the battery pack to the mating latching element of the electrical device, wherein the user-actuated unlatching operating element is arranged within manual reach of a topside handle of the battery pack. This has the advantage that the user can usually actuate the unlatching operating element with the same hand with which he holds the battery pack at the handle. This consequently makes one-handed operation possible for the unlatching, and possibly also the pivoting out, of the battery pack from its holding position at the electrical device into the docking position at the electrical device and, if necessary, also for the complete removal of the battery pack from the electrical device out of the docking position.

In one embodiment of the invention, a distance of the device docking element of the battery pack from a battery pack longitudinal median plane is less than a distance of the device docking element from a battery pack rear side. This makes it possible for the battery pack to be docked to the electrical device relatively close to the longitudinal axis, which in turn can be advantageous, for example, for a space-saving insertion of the battery pack into a accepting space of the electrical device and/or for holding the battery pack at or in the electrical device.

In one embodiment of the invention, a distance of the device holding element of the battery pack from a battery pack longitudinal median plane is less than a distance of the device holding element from a battery pack rear side. This measure can similarly be favourable to the accepting of the battery pack in an accepting space of the electrical device and/or a secure holding of the battery pack at or in the electrical device.

According to a further aspect of the invention, which can be provided in addition to or as an alternative to the aspect of the invention mentioned above, the battery pack coupling system comprises an electrical coupling interface at the battery pack and an electrical connecting line with a connecting plug body at the end which can be releasably coupled to the electrical coupling interface of the battery pack. The battery pack coupling system additionally comprises a plug fastening mechanism through which the connecting plug body can be fastened releasably to the harness device.

This measure has the advantage that the electrical connecting line can be coupled via its connecting plug body to the electrical coupling interface of the battery pack independently of whether or not the battery pack is located at the harness device, and that the connecting plug body of the electrical connecting line can act as the electrical coupling interface of the harness device in that the connecting plug body when required is fastened releasably to the harness device by the plug fastening mechanism. It is therefore not necessary for the harness device to have a dedicated electrical coupling interface at a fixed position in order to connect the battery pack electrically to an electrical device when the battery pack is located at the harness device. In point of fact the same electrical connecting mechanism can be used to connect an electrical device electrically to the battery pack, both in the case in which the battery pack is held at the harness device as well as in the case in which the battery pack is used in a different position without the harness device to supply an electrical device with electrical energy through the connecting line.

Preferably, the electrical coupling interface of the battery pack is, moreover, further designed to be coupled directly to a corresponding electrical device interface of an electrical device in order to connect the electrical device electrically to the battery pack when the battery pack is mechanically coupled to the electrical device.

The electrical coupling interface of the battery pack can optionally also function as a charging interface in order to electrically recharge the battery pack. In that case a second, separate electrical coupling interface at the battery pack for this purpose can be omitted. The electrical connecting line with its connecting plug body can here preferably also act as the charging connection for the battery pack. Another conventional charging connecting line can alternatively be used for this purpose.

In a development of the invention, the battery pack can be coupled mechanically to the harness device through a docking movement and a subsequent pivoting movement from a backpack docking position into a backpack holding position, wherein the electrical coupling of the electrical coupling interface of the battery pack to the connecting plug body of the electrical connecting line takes place automatically through the pivoting of the battery pack that is docked at the harness device into the backpack holding position when the connecting plug body is fastened to the harness device.

In a development of the invention, the electrical device comprises an electrical device interface that can be coupled to the electrical coupling interface at the battery pack, and the battery pack can be coupled mechanically to the electrical device through a docking movement and a subsequent pivoting movement into a device holding position, wherein the coupling of the electrical coupling interface of the battery pack to the electrical device interface of the electrical device takes place automatically through the pivoting of the battery pack that is docked at the electrical device into the device holding position.

In these last-mentioned developments of the invention, it follows that a separate manipulation for electrically coupling the battery pack to the harness device or to the electrical device can be omitted; the electrical coupling takes place here automatically with the mechanical coupling of the battery back to the harness device or to the electrical device. It is advantageously provided here that a backpack pivoting angle through which the battery pack is pivoted between its backpack docking position and its backpack holding position at the harness device is at least 20° and/or a device pivoting angle through which the battery pack is pivoted between its device docking position and its device holding position at the electrical device is at least 20°. This relatively large pivoting angle is advantageous from the points of view of handling, stability and the exercise of force for the mechanical coupling of the battery pack to the harness device or to the electrical device.

In a development of the invention the plug fastening mechanism comprises a releasable latching connection of the connecting plug body at a carrier base of the harness device. The connecting plug body can thus be held latched releasably at the harness device in a simple manner.

In a development of the invention, the electrical coupling interface of the battery pack is arranged at an upper rear region of the battery pack. This represents an advantageous positioning of the electrical coupling interface at the battery pack, both for the coupling of the battery pack to the harness device as well as for its coupling to the electrical device, in particular in implementations in which the battery pack is docked in a lower region at the harness device or the electrical device.

Advantageous embodiments of the invention are illustrated in the drawings. These and other advantageous embodiments of the invention are explained and described in more detail below.

BRIEF DESCRIPTION OF THE DRAWINGS

In the drawings:

FIG. 5 shows the view of FIG. 4 with the battery pack in a backpack holding position.

FIG. 6 shows a perspective plan view of a battery pack accepting region of an electrical device fed by the battery pack.

FIG. 7 shows a perspective plan view of the battery pack accepting region of the electrical device with the battery pack coupled in the device docking position.

FIG. 8 shows a longitudinal sectional view corresponding to the perspective view of FIG. 7.

FIG. 9 shows the view of FIG. 8 with the battery pack in the device holding position.

FIG. 10 shows a perspective view of an electrical connecting line with connecting plug body at the end.

FIG. 11 shows a perspective view of the connecting plug body.

FIG. 12 shows a cutaway illustration of the view of FIG. 11.

DETAILED DESCRIPTION OF THE DRAWINGS

Figure 1:
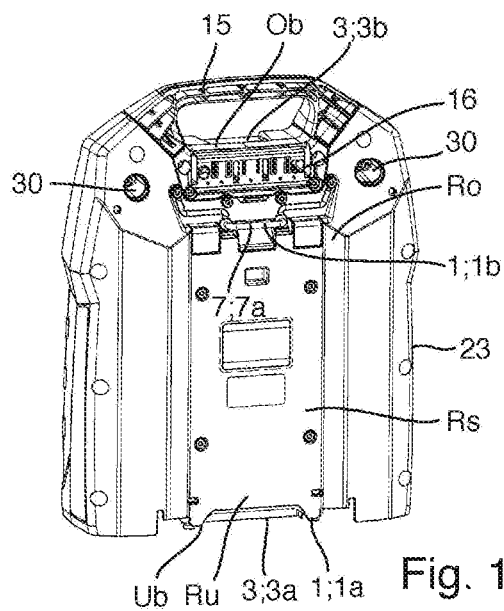
FIG. 1 shows a perspective rear view of a battery pack with two different mechanical coupling interfaces and an electrical coupling interface.

Advantageous embodiments of a battery pack coupling system for mechanically and/or electrically coupling a battery pack 23 selectively to a harness device 24 or to a manually operated electrical device 25, which in particular can be an electrically driven garden and/or woodland cultivation device, are shown in the various illustrations of FIGS. 1 to 12, where yet further advantageous embodiments or variants of such a battery pack coupling system are explained below.

The battery pack coupling system contains a mechanical backpack coupling interface 1 at the battery pack 23 for the releasable mechanical coupling to a corresponding mechanical battery pack-backpack coupling interface 2 at the harness device 24. The battery pack coupling system furthermore contains a mechanical device coupling interface 3 at the battery pack 23, different from the mechanical backpack coupling interface 1, for the releasable mechanical coupling to a corresponding mechanical battery pack-device coupling interface 4 at the electrical device 25.

In corresponding embodiments, the mechanical backpack coupling interface 1 comprises, as illustrated, a backpack docking element 1a for the pivotable docking of the battery pack 23 to the harness device 24, and a backpack holding element 1b for holding the battery pack 23 at the harness device 24. The backpack docking element 1a is arranged here at a lower rear region Ru of the battery pack 23, and the backpack holding element 1b is arranged at an upper rear region Ro of the battery pack 23; see, for example, FIGS. 1 to 3 and 5. In advantageous realizations, the backpack docking element 1a is in particular arranged at a lower rear corner region Rsu of the battery pack, as illustrated. It can alternatively be arranged at a distance from the lower rear corner region Rsu of the battery pack 23.

Figure 3:
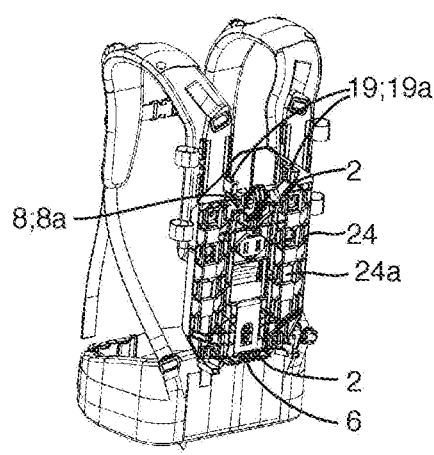
FIG. 3 shows a perspective view of a harness device for the battery pack with associated mechanical battery pack-backpack coupling interface.
Figure 4:
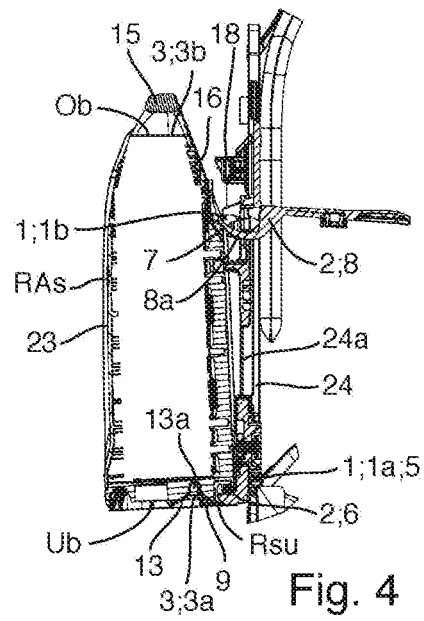
FIG. 4 shows a schematic longitudinal sectional view of the battery pack coupled to the harness device in a pivoted-in backpack docking position.

In advantageous realizations, the backpack docking element 1a comprises a backpack wire bracket element 5, as illustrated, or alternatively a backpack bracket accepting element, and the battery pack coupling system comprises the corresponding mechanical battery pack-backpack coupling interface 2 at the harness device 24, wherein the mechanical battery pack-backpack coupling interface 2 comprises a backpack bracket accepting element 6 that works together in a pivoting manner with the backpack wire bracket element 5, see e.g. FIGS. 3 to 5, or alternatively a backpack wire bracket element that works together in a pivoting manner with the backpack bracket accepting element of the battery pack 23.

In appropriate embodiments, the backpack holding element 1b of the battery pack 23 contains a backpack latching element 7, and the battery pack coupling system contains the corresponding mechanical battery pack-backpack coupling interface 2 at the harness device 24, wherein the mechanical battery pack-backpack coupling interface 2 contains a backpack mating latching element 8 that works together in a releasable latching manner with the backpack latching element 7, as can also be seen from FIGS. 3 to 5.

In an advantageous realization, as illustrated, the backpack latching element 7 is formed by a wire bracket element 7a that can be latched from the rear, and the backpack mating latching element 8 is formed by a pivot lever 8 with a latching/holding bracket 8a that reaches behind the wire bracket element 7a. By pivoting the pivot lever 8 from a release position illustrated in FIG. 4 into a holding position illustrated in FIG. 5, the battery pack 23 is pivoted from a backpack docking position RAs in which it is already pivoted up to the latching/holding bracket 8a into its backpack holding position RFs according to FIG. 5 at the harness device 24, in particular at a carrier base 24a of the harness device 24.

In appropriate embodiments, the mechanical device coupling interface 3 contains, as illustrated, a device docking element 3a at the battery pack 23 for the pivotable docking of the battery pack 23 to the electrical device 25, and a device holding element 3b at the battery pack 23 for holding the battery pack 23 at the electrical device 25, wherein the device docking element 3a is arranged at an underside region Ub of the battery pack 23, and the device holding element 3b is arranged at a topside region Ob of the battery pack 23, see, for example, FIGS. 1, 2, 4 and 5.

In appropriate realizations, the device docking element 3a contains a device bracket accepting element 9 at the battery pack, as illustrated, or alternatively a device wire bracket element, and the battery pack coupling system comprises the corresponding mechanical battery pack-device coupling interface 4 at the electrical device 25, wherein the mechanical battery pack-device coupling interface 4 comprises a device wire bracket element 10 at the electrical device 25 that works together in a pivoting manner with the device bracket accepting element 9, or a device bracket accepting element that works together in a pivoting manner with the device wire bracket element of the battery pack.

In advantageous realizations, the device bracket accepting element 9 contains, as illustrated, an accepting profile body 13 with a bracket accepting region 13a having a U-shaped cross-section, see e.g. FIGS. 2, 5, 8 and 9.

In appropriate embodiments, the device holding element 3b of the battery pack 23 comprises a device latching element 11, and the battery pack coupling system comprises the corresponding mechanical battery pack-device coupling interface 4 at the electrical device 25, wherein the mechanical battery pack-device coupling interface 4 comprises a device mating latching element 12 that works together in a releasable latching manner with the device latching element 11, as can be seen e.g. from FIGS. 7 to 9.

In advantageous realizations, the battery pack coupling system contains, as illustrated, a user-actuated unlatching operating element 14 for releasing the latching connection of the device latching element 11 of the battery pack 23 to the mating latching element 12 of the electrical device 25, wherein the user-actuated unlatching operating element 14 is arranged within manual reach of a topside handle 15 of the battery pack 23, as can in particular be seen from FIG. 9.

In an advantageous realization, the unlatching operating element 14 is formed, as illustrated, by a rocker lever that can be pivoted by the user. The rocker lever can be formed integrated with the device mating latching element 12, and is preferably held by a tensioning spring pressing in the direction of the latching position at the electrical device 25. In an advantageous embodiment, the rocker lever is provided with a run-up slope, as can be seen, for example, from FIG. 8, by means of which it can automatically be pivoted into its unlatching or release position by the battery pack 23 as it is pivoted from a device docking position GAs illustrated in FIGS. 7 and 8 into a device holding position GFs illustrated in FIG. 9, in order then, under the influence of the tensioning spring, to automatically return again into the latching position as soon as the battery pack 23 has reached its device holding position GFs.

As can in particular be seen from FIG. 9, in appropriate embodiments a distance AVM of the device docking element 3a of the battery pack 23 from a battery pack longitudinal median plane LMA is less than a distance AVR of the device docking element 3a from a battery pack rear side Rs, and/or a distance AFM of the device holding element 3b of the battery pack 23 from a battery pack longitudinal median plane LMA is smaller than the distance AFR of the device holding element 3b from the battery pack rear side Rs. The battery pack 23 can thereby mechanically be held very stably and with good support in or at the electrical device 25.

In an advantageous realization, the battery pack comprises a positioning aid 30 that helps its holding position at the harness device 24 and/or at the electrical device 25 to be reached reliably. In the example illustrated, the positioning aid 30 comprises a plurality of positioning recesses into which the matching positioning projections at the harness device 24 and/or at the electrical device 25 can engage. In the example illustrated, the electrical device has such positioning projections as corresponding positioning aids 31 for this purpose.

In the example illustrated, the electrical device 25 has a battery pack accepting space 26 in which the battery pack 23 can be accommodated for mechanical and electrical coupling to the electrical device 25, and which can be covered by a device hood 27 arranged in a pivoting manner.

In appropriate forms of embodiment, the battery pack coupling system comprises an electrical coupling interface 16 at the battery pack 23 as well as an electrical connecting line 17 with a connecting plug body 18 at the end which can be releasably coupled to the electrical coupling interface 16. The battery pack coupling system in this case furthermore contains a plug fastening mechanism 19 through which the connecting plug body 18 can be fastened releasably to the harness device 24.

In advantageous embodiments, the battery pack 23 can be coupled mechanically to the harness device 24 through a docking movement and a subsequent pivoting movement from a backpack docking position RAs into the backpack holding position RFs, as is suggested in FIG. 5, wherein the electrical coupling of the electrical coupling interface 16 to the connecting plug body 18 takes place through the pivoting of the battery pack 23 that is docked at the harness device 24 into the backpack holding position RFs when the connecting plug body 18 is fastened at the harness device 24.

In advantageous embodiments, the electrical device 25 comprises an electrical device interface 29 that can be coupled to the electrical coupling interface 16 at the battery pack 23, and the battery pack 23 can be coupled mechanically to the electrical device 25 through a docking movement and a subsequent pivoting movement from the device docking position GAs into the device holding position GFs, as can be seen from FIGS. 8 and 9, wherein the coupling of the electrical coupling interface 16 of the battery pack to the electrical device interface 29 of the electrical device 25 takes place automatically through the pivoting of the battery pack 23 that is docked at the electrical device 25 into the device holding position GFs.

A backpack pivoting angle RW of the battery pack 23 between the backpack docking position RAs and the backpack holding position RFs is at least 20°, and/or a device pivoting angle GW of the battery pack 23 between the device docking position GAs and the device holding position GFs is at least 20°. This relatively large pivoting angle RW or GW is an aid to the mechanical coupling, and to the electrical coupling thereby simultaneously automatically effectuated, of the battery pack 23 to the harness device 24 or to the electrical device 25.

In advantageous embodiments, the plug fastening mechanism 19 comprises a releasable latching connection 19a of the connecting plug body 18 at the carrier base 24a of the harness device 24, see FIGS. 3 and 10 to 12, such as for example one or a plurality of latching lugs at the connecting plug body 18 and one or a plurality of corresponding latching receptacles at the carrier base 24a.

In advantageous realizations, the electrical coupling interface 16 of the battery pack 23 is arranged, as illustrated, at the upper rear region Ro of the battery pack 23. This is favourable for the electrical coupling of the battery pack 23 optionally directly to the electrical device 25 or to the connecting plug body 18 mounted at the harness device 24.

Figure 2:
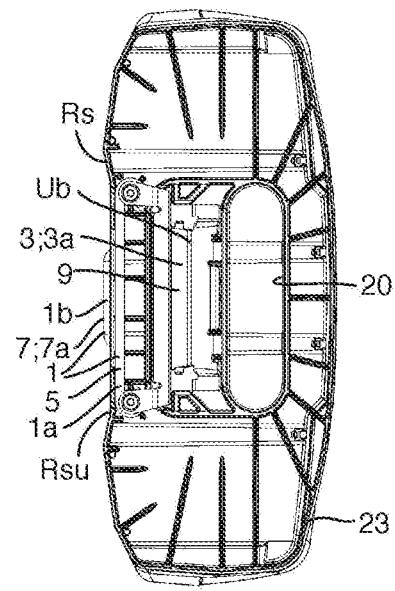
FIG. 2 shows a plan view of an underside of the battery pack.

For easier handling of the battery pack 23 when coupling to the harness device 24, and in particular when coupling to the electrical device 25, a recessed grip 20 is optionally provided in the underside region Ub of the battery pack 23, and thus provided lying opposite the handle 15 at the battery pack upper side Ob; see in particular FIGS. 2 and 8. The user can thereby, when required, comfortably hold and handle the battery pack 23 with two hands.

In advantageous embodiments, the connecting plug body 18, as shown in FIGS. 10 to 12, contains a plurality of electrical contact tongues 21 of which at least two adjacent contact tongues 21a, 21b are formed by U-edges 22a, 22b of a one-piece, U-shaped electrical contact element 22 and are in this way electrically short-circuited. This measure can offer advantages both to function and production. By using a U-shaped contact element 22 of this sort, e.g. as a U-contact plate, only a single welding and pressing procedure is necessary for the contact pair concerned. In addition, a better positioning accuracy can be achieved for the two contact tongues 21a, 21b through the common U-shaped body in comparison to the use of a pair of individual contact tongues. From the functional point of view, current magnitude differences can be balanced automatically through the electrically short-circuiting U-connection of these contact tongues 21a, 21b, and the contact abrasion remains equal, or at least more equal, even in the event that in the course of the period of use pairs of contact tongues on the one hand and tongue receptacles on the other hand that have been worn differently are present.

As is made clear by the exemplary embodiments illustrated and explained further above, the invention makes a battery pack coupling system available with which a battery pack can be mechanically and/or electrically coupled selectively to a harness device or to a manually operated electrical device in a very advantageous manner and with advantageous functional properties.

The harness device can, for example, be one such as is disclosed in the European patent application no. 18194891.0 of the applicant, whose disclosure is, to the full extent, hereby incorporated through reference as part of the disclosure of the present application. The battery pack can, for example, be one such as is disclosed in the European patent application no. 18194901.7 of the applicant, whose disclosure is, to the full extent, hereby incorporated through reference as part of the disclosure of the present application.

What is claimed is:

1. A battery pack coupling system for at least one of mechanically and electrically coupling a battery pack selectively to a harness device or to a manually operated electrical device, the battery pack coupling system comprising:
   a mechanical backpack coupling interface at the battery pack for releasable mechanical coupling to a corresponding mechanical battery pack-backpack coupling interface at the harness device; and
   a mechanical device coupling interface at the battery pack, different from the mechanical backpack coupling interface, for releasable mechanical coupling to a corresponding mechanical battery pack-device coupling interface at the electrical device.

2. The battery pack coupling system according to claim 1, wherein the mechanical backpack coupling interface comprises a backpack docking element for the pivotable docking of the battery pack to the harness device, and a backpack holding element for holding the battery pack at the harness device, wherein the backpack docking element is arranged at a lower rear region of the battery pack, and the backpack holding element is arranged at an upper rear region of the battery pack.

3. The battery pack coupling system according to claim 2, wherein the backpack docking element is arranged at a lower rear corner region of the battery pack.

4. The battery pack coupling system according to claim 2, wherein the backpack docking element comprises a backpack wire bracket element or a backpack bracket accepting element, and the battery pack coupling system contains the corresponding mechanical battery pack-backpack coupling interface at the harness device, and the mechanical battery pack-backpack coupling interface comprises a backpack bracket accepting element that works together in a pivoting manner with the backpack wire bracket element, or a backpack wire bracket element that works together in a pivoting manner with the backpack bracket accepting element.

5. The battery pack coupling system according to claim 2, wherein the backpack holding element contains a backpack latching element, and the battery pack coupling system contains the corresponding mechanical battery pack-backpack coupling interface at the harness device, and the mechanical battery pack-backpack coupling interface contains a backpack mating latching element that works together in a releasable latching manner with the backpack latching element.

6. The battery pack coupling system according to claim 1, wherein the mechanical device coupling interface comprises a device docking element for the pivotable docking of the battery pack to the electrical device, and a device holding element for holding the battery pack at the electrical device, wherein the device docking element is arranged at an underside region of the battery pack, and the device holding element is arranged at a topside region of the battery pack.

7. The battery pack coupling system according to claim 6, wherein the device docking element comprises a device bracket accepting element or a device wire bracket element, and the battery pack coupling system contains the corresponding mechanical battery pack-device coupling interface at the electrical device, and the mechanical battery pack-device coupling interface comprises a device wire bracket element that works together in a pivoting manner with the device bracket accepting element, or a device bracket accepting element that works together in a pivoting manner with the device wire bracket element.

8. The battery pack coupling system according to claim 7, wherein the device bracket accepting element contains an accepting profile body with a bracket accepting region having a U-shaped cross-section.

9. The battery pack coupling system according to claim 6, wherein the device holding element contains a device latching element, and the battery pack coupling system contains the corresponding mechanical battery pack-device coupling interface at the electrical device, and the mechanical battery pack-device coupling interface contains a device mating latching element that works together in a releasable latching manner with the device latching element.

10. The battery pack coupling system according to claim 9, further comprising:
a user-actuated unlatching operating element for releasing the latching connection of the device latching element of the battery pack to the mating latching element of the electrical device, wherein the user-actuated unlatching operating element is arranged within manual reach of a topside handle of the battery pack.

11. The battery pack coupling system according to claim 6, wherein a distance of the device docking element from a battery pack longitudinal median plane is less than a distance of the device docking element from a battery pack rear side.

12. The battery pack coupling system according to claim 6, wherein a distance of the device holding element from a battery pack longitudinal median plane is less than a distance of the device holding element from a battery pack rear side.

13. The battery pack coupling system according to claim 1, wherein the manually operated electrical device is an electrically driven garden or woodland cultivation device.

14. A battery pack coupling system for at least one of mechanically and electrically coupling a battery pack selectively to a harness device or to a manually operated electrical device, the battery pack coupling system comprising:
an electrical coupling interface at the battery pack;
an electrical connecting line with a connecting plug body at the end which can be releasably coupled to the electrical coupling interface; and
a plug fastening mechanism through which the connecting plug body can be fastened releasably to the harness device.

15. The battery pack coupling system according to claim 14, wherein
the battery pack can be coupled mechanically to the harness device through a docking movement and a subsequent pivoting movement from a backpack docking position into a backpack holding position, and, when the connecting plug body is fastened at the harness device, the electrical coupling of the electrical coupling interface to the connecting plug body takes place through the pivoting of the battery pack that is docked at the harness device into the backpack holding position, and
at least one of a backpack pivoting angle of the battery pack between the backpack docking position and the backpack holding position and a device pivoting angle of the battery pack between the device docking position and the device holding position is at least 20°.

16. The battery pack coupling system according to claim 14, wherein
the electrical device comprises an electrical device interface that can be coupled to the electrical coupling interface at the battery pack, and the battery pack can be coupled mechanically to the electrical device through a docking movement and a subsequent pivoting movement from a device docking position into a device holding position and the coupling of the electrical coupling interface to the electrical device interface takes place through the pivoting of the battery pack that is docked at the electrical device into the device holding position, and
at least one of a backpack pivoting angle of the battery pack between the backpack docking position and the backpack holding position and a device pivoting angle of the battery pack between the device docking position and the device holding position is at least 20°.

17. The battery pack coupling system according to claim 14, wherein the plug fastening mechanism comprises a releasable latching connection of the connecting plug body at a carrier base of the harness device.

18. The battery pack coupling system according to claim 14, wherein the electrical coupling interface is arranged at an upper rear region of the battery pack.

19. The battery pack coupling system according to claim 14, further comprising:
- a mechanical backpack coupling interface at the battery pack for the releasable mechanical coupling to a corresponding mechanical battery pack-backpack coupling interface at the harness device; and
- a mechanical device coupling interface at the battery pack, different from the mechanical backpack coupling interface, for the releasable mechanical coupling to a corresponding mechanical battery pack-device coupling interface at the electrical device.

* * * * *